Dec. 9, 1941.  O. C. FREDERICK  2,265,725
WELDING
Filed July 9, 1940
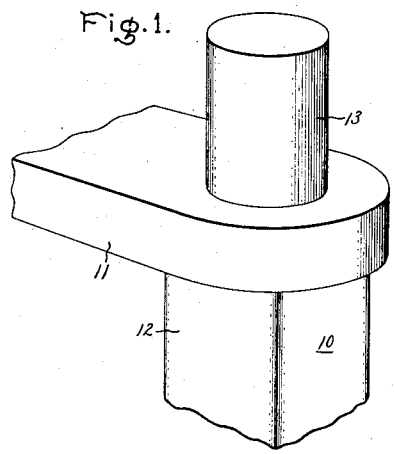
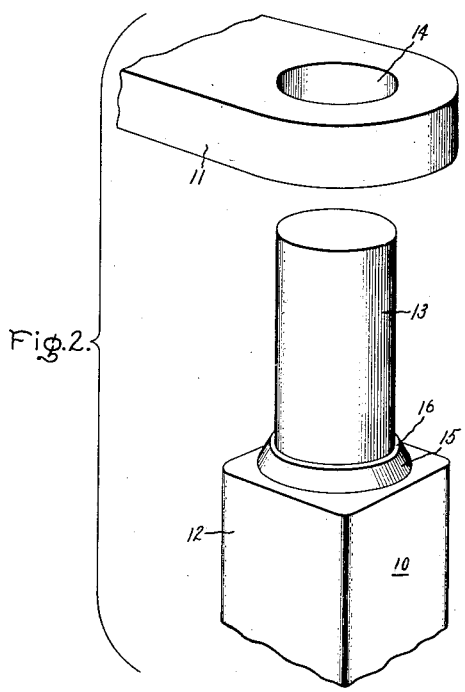
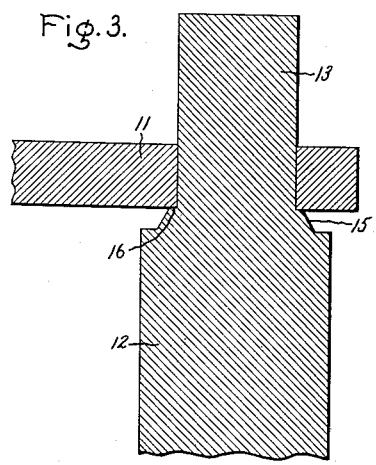
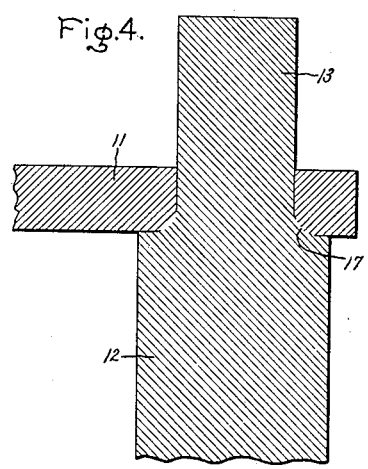
Inventor:
Oscar C. Frederick,
by Harry E. Dunham
His Attorney.

Patented Dec. 9, 1941

2,265,725

UNITED STATES PATENT OFFICE 2,265,725

WELDING

Oscar C. Frederick, Springfield, Pa., assignor to General Electric Company, a corporation of New York Application July 9, 1940, Serial No. 344,532

6 Claims. (Cl. 219—10)

My invention relates to welding and more particularly to resistance welding.

In resistance welding, it has sometimes been found desirable to provide the members to be welded with abutting surfaces including a projection of limited area for obtaining sufficient resistance to perform a satisfactory weld with a relatively small current. Accordingly, it is an object of my invention to provide a new and improved welding projection in association with a member to be welded to another member.

It is another object of my invention to provide a method for securing together metal members utilizing the aforesaid projection.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which Fig. 1 is a partial perspective view of a pair of members comprising a welding assembly embodying the principles of my invention; Fig. 2 is an exploded perspective view of the members shown in Fig. 1; Fig. 3 is a sectional view of the welding assembly shown in Fig. 1; and Fig. 4 is a view similar to Fig. 3 showing a cross section through the members after welding thereof.

In the drawing I have illustrated the application of my invention to a pair of members 10 and 11 which, for example, might find application as the crank shaft and the switch operating arm, respectively, of a circuit breaker.

The member 10 comprises a body part 12 and a pilot portion 13 adapted to extend relatively loosely into an opening 14 in the member 11. The opening should be large enough to permit ready assembly of the parts or members but not large enough to permit substantial lateral motion therebetween. While an aperture or opening extending entirely through the member 11 is shown, if desired, a suitably shaped depression or recess may be provided in the face of one of the members.

I have provided a welding projection at the base or inner end of the pilot portion or locating stud 13. In order to secure a weld over a relatively large area, the inner end of the projection is provided with a relatively large area. In the illustrated arrangement the inner or base end of the projection is made generally conical or tapered as indicated by the numeral 15, the sides of the conical portion 15 converging in the direction of the outer or free end of the pilot portion 13. In order to keep the initial contact area between the parts to be welded small enough to enable the welding operation to be performed with a relatively small current, the outer or reduced end of the projection adjacent the member 11 when assembled for welding, is arranged in the form of a narrow ledge or relatively flat shoulder 16 of limited area, the shoulder constituting the entire welding surface associated with the member 11 during initiation of the welding operation. To secure best results, I have found it desirable that the contacting surfaces including shoulder 16 be the only welding surfaces at the start of the welding operation although I contemplate the spread of the welding area to include the area of the base of the conical portion during the application of welding current. Inasmuch as the sides or walls of the opening are parallel to each other and the sides of the pilot portion are also parallel, this condition is achieved by providing a relatively loose fit between the members, as described. However, any desired configuration of recess or opening wall and pilot surface may be employed so long as no contacting areas which pass any substantial amount of welding current are provided in addition to that contacting area established between shoulder 16 and member 11.

In order to weld the members 10 and 11, member 10 is moved to insert the pilot portion thereof into the opening 14 and bring the shoulder of the projection into continuous engagement with the material adjacent to and surrounding the opening. In Figs. 1 and 3, I have illustrated a welding assembly with the parts thereof in juxtaposed position ready for welding. In view of the fact that welding apparatus suitable for the welding operation required will be apparent to those skilled in the art, apparatus for performing this operation has not been illustrated. Pressure is applied to maintain the welding surfaces in close engagement and upon application of welding current, the temperature of the contacting surfaces of the shoulder 16 and the material adjacent the edge of the opening 14 is raised until the welding temperature is reached at which time additional pressure is applied to form the complete weld. During this process the material adjacent the edge of the opening or recess and the material of the projection become fused together as indicated at 17 in Fig. 4 to provide the welded assembly.

From the foregoing description it will be seen that I have provided a particularly advantageous welding projection in association with a pilot portion or stud of a member to be welded. The provision of the relatively flat shoulder 16 is beneficial in that there is maintained a fixed relation from the top surface of the member 11 to the end of the stud or pilot portion of member 10 and accurate assembly of the parts is assured, thus making possible a uniform welded product. Variations in the sizes of the opening or recess and the pilot portion normally encountered in manufacturing practice can have little harmful effect. Thus variation in diameter of the opening 14, as long as the opening is not greater in diameter than the shoulder 16, tends to increase the current density, and, therefore, the heat developed, because of the smaller portion of the shoulder area in contact with member 11. On the other hand, if the pilot portion is slightly undersize, the same result occurs, while if the pilot portion is too large to any substantial degree, it cannot be inserted into the recess or opening. By limiting the area of the shoulder in contact with the plate, I establish conditions suitable for raising the engaging parts to the proper temperature with a relatively low current and by adding the conical portion, I assure adequate area for a satisfactory weld.

While I have shown the welding of a shaft-like member to a plate-like member, my invention is applicable wherever it is desired to weld together two metallic, relatively small members. Moreover, while I have shown a tapered or sloping base portion associated with the welding projection, any desired character of surface 15 may be employed, as one or more steps, for example. Therefore, I do not desire my invention to be limited to the particular construction shown and described and I intend in the appended claims to cover all modifications within the spirit and scope of my invention.

What I claim as new and desire to secure by Letters Patent of the United States is:

1. An article of manufacture comprising a body adapted to be welded in a recess or the like and having a pilot portion provided with a welding projection, said projection having a relatively large area at the inner or base end thereof to provide a relatively large welding area and a shoulder at the outer or free end thereof of a relatively small area as compared to the area of the base end, said shoulder constituting the entire welding surface during initiation of the welding operation and said relatively large area constituting a welding surface during the final stages of the welding operation.

2. An article of manufacture comprising a body adapted to be welded in a recess or the like in a member and having a pilot portion provided with a welding projection, said projection including a tapered portion terminating in a shoulder at the reduced end thereof, said tapered portion tapering toward the free or outer end of said pilot portion, said shoulder constituting a welding surface for engagement with the material adjacent the recess in said member and constituting the entire welding surface during initiation of the welding operation and said tapered portion constituting a welding surface during the final stages of the welding operation.

3. An article of manufacture comprising a body adapted to be welded in a recess or the like in a member and having a pilot portion provided with a generally conical-shaped projection at the base of said portion, said projection terminating in a relatively flat shoulder at the reduced end thereof, said conical portion tapering toward the free or outer end of said pilot portion, said shoulder having a limited area and constituting a welding surface for engagement with the material adjacent the recess in said member and constituting the entire welding surface during initiation of the welding operation and said conical portion constituting a welding surface during the final stages of the welding operation.

4. An article of manufacture comprising a body adapted to be welded in a recess or the like in a member and having a pilot portion constructed and arranged to be inserted relatively loosely into the recess whereby said member and said body are self-locating, a generally conical-shaped projection at the base of said portion, said conical portion tapering toward the free or outer end of said pilot portion, said projection terminating in a relatively flat shoulder at the reduced end thereof, said shoulder having a limited area and constituting a welding surface for engagement with the material adjacent the recess in said member and constituting the entire welding surface during initiation of the welding operation and said conical portion constituting a welding surface during the final stages of the welding operation.

5. A welding assembly comprising a pair of members, one of said members having a recess or the like in a face thereof, the other of said members having a pilot portion extending into said recess, a generally conical-shaped projection at the base of said portion, said conical portion tapering toward the free or outer end of said pilot portion, said conical projection terminating in a relatively flat shoulder of limited area at the reduced end of said projection, said shoulder engaging said one of said members and constituting a welding surface in engagement with the material adjacent said recess when said members are thus placed in juxtaposition said shoulder constituting the entire welding surface during initiation of the welding operation and said conical portion constituting a welding surface during the final stages of said welding operation.

6. The method of resistance welding a first member to a second member comprising forming a recess or the like in said second member, providing a pilot portion on said first member, dimensioning said portion to extend relatively loosely into said recess whereby said members are self-locating when said portion is inserted in the recess, providing a generally conical-shaped projection at the base of said portion, said conical portion tapering toward the free or outer end of said pilot portion, providing a relatively flat shoulder of limited area at the reduced end of said projection, moving said first member to bring said shoulder into continuous engagement under pressure with the material adjacent said recess in said second member, passing welding current through the members for raising the engaging parts to welding temperature, and applying additional pressure to the members to completely weld the same when the welding temperature is reached.

OSCAR C. FREDERICK.